(12) United States Patent
Breynaert et al.

(10) Patent No.: US 7,764,608 B2
(45) Date of Patent: Jul. 27, 2010

(54) MANAGING TRAFFIC IN A SATELLITE TRANSMISSION SYSTEM

(75) Inventors: Dirk Breynaert, Sint-Niklaas (BE); Maximilien d'Oreye de Lantremange, Overijse (BE); Daniel Delaruelle, Sint-Niklaas (BE)

(73) Assignee: Newtec CY, Sint-Niklaas (BE)

( * ) Notice: Subject to any disclaimer, the term of this patent is extended or adjusted under 35 U.S.C. 154(b) by 303 days.

(21) Appl. No.: 11/886,871

(22) PCT Filed: Mar. 21, 2005

(86) PCT No.: PCT/BE2005/000037

§ 371 (c)(1),
(2), (4) Date: Sep. 21, 2007

(87) PCT Pub. No.: WO2006/099695

PCT Pub. Date: Sep. 28, 2006

(65) Prior Publication Data

US 2009/0052323 A1     Feb. 26, 2009

(51) Int. Cl.
*H04L 12/24* (2006.01)
*H04J 3/02* (2006.01)
*H04N 7/20* (2006.01)

(52) U.S. Cl. .................. 370/230; 370/235; 370/537; 375/240.23; 725/63

(58) Field of Classification Search .......... 370/229–237, 370/532–545, 310, 315–316; 375/240.01–240.29; 725/63, 67–68, 70–71

See application file for complete search history.

(56) References Cited

U.S. PATENT DOCUMENTS 6,421,359 B1 * 7/2002 Bennett et al. .............. 370/538

(Continued)

FOREIGN PATENT DOCUMENTS

CA         2 321 015 A1     3/2002

(Continued)

OTHER PUBLICATIONS

"Digital Video Broadcasting (DVB) User guidelines for the second generation system for Broadcasting, Interactive Services, News Gathering and other broadband satellite applications (DVB-S2); ETSI TR 102 376" Feb. 2005, ETSI Standards, European Telecommunications Standards Institute, Sophia-Antipo, FR, XP014027139 ISSN: 0000-0001.

(Continued)

*Primary Examiner*—Tri H Phan
(74) *Attorney, Agent, or Firm*—Bacon & Thomas, PLLC (57) ABSTRACT

Methods and apparatus are described for management of traffic comprising a statistical shaper having a plurality of inputs each for receiving a data stream and a plurality of outputs forming a variable rate bit streams; a multiplexer which combines the bit streams to form an output stream; a modulation stage which is operable to use one or more of a plurality of different modulation schemes to modulate the bit streams onto an output bearer; and, a controller which is operable to control the amount of data arriving at the modulation stage. The controller performs rate control of the data arriving at the modulation stage so that the rate of data output in the output stream from the modulator stage is within a predetermined limit for the transmission channel. For example if the modulation rate for any one bitstream changes, this would alter the rate of data transmission after the modulation stage except that excess data is stored in buffers. For example, by controlling the data rate arriving at the modulator stage, the controller regulates the amount of data stored in buffers at the modulation stage.

18 Claims, 5 Drawing Sheets

U.S. PATENT DOCUMENTS

| | | | | |
|---|---|---|---|---|
| 7,418,007 B1 * | 8/2008 | Liu et al. | .................... | 370/468 |
| 7,466,967 B2 * | 12/2008 | Takeshita et al. | ............ | 455/130 |
| 7,519,124 B2 * | 4/2009 | Oksman et al. | ............. | 375/260 |
| 7,607,154 B2 * | 10/2009 | Morello | ....................... | 725/63 |
| 2005/0068992 A1 * | 3/2005 | Kaku et al. | ................. | 370/535 |

FOREIGN PATENT DOCUMENTS

EP          0 759 667 A      2/1997

OTHER PUBLICATIONS

Examination Report of Australia Patent Office regarding Australia patent application No. 2005329718, Sep. 17, 2009.

* cited by examiner

MANAGING TRAFFIC IN A SATELLITE TRANSMISSION SYSTEM

FIELD OF THE INVENTION

This invention relates to a method of managing a plurality of traffic flows in a transmission system, such as a satellite transmission system, e.g. Digital Video Broadcasting transmission system, which has, for example, a transmission channel of limited bandwidth for carrying the traffic flows, a system for carrying out the method and software for carrying out the method.

BACKGROUND TO THE INVENTION

Figure 1:
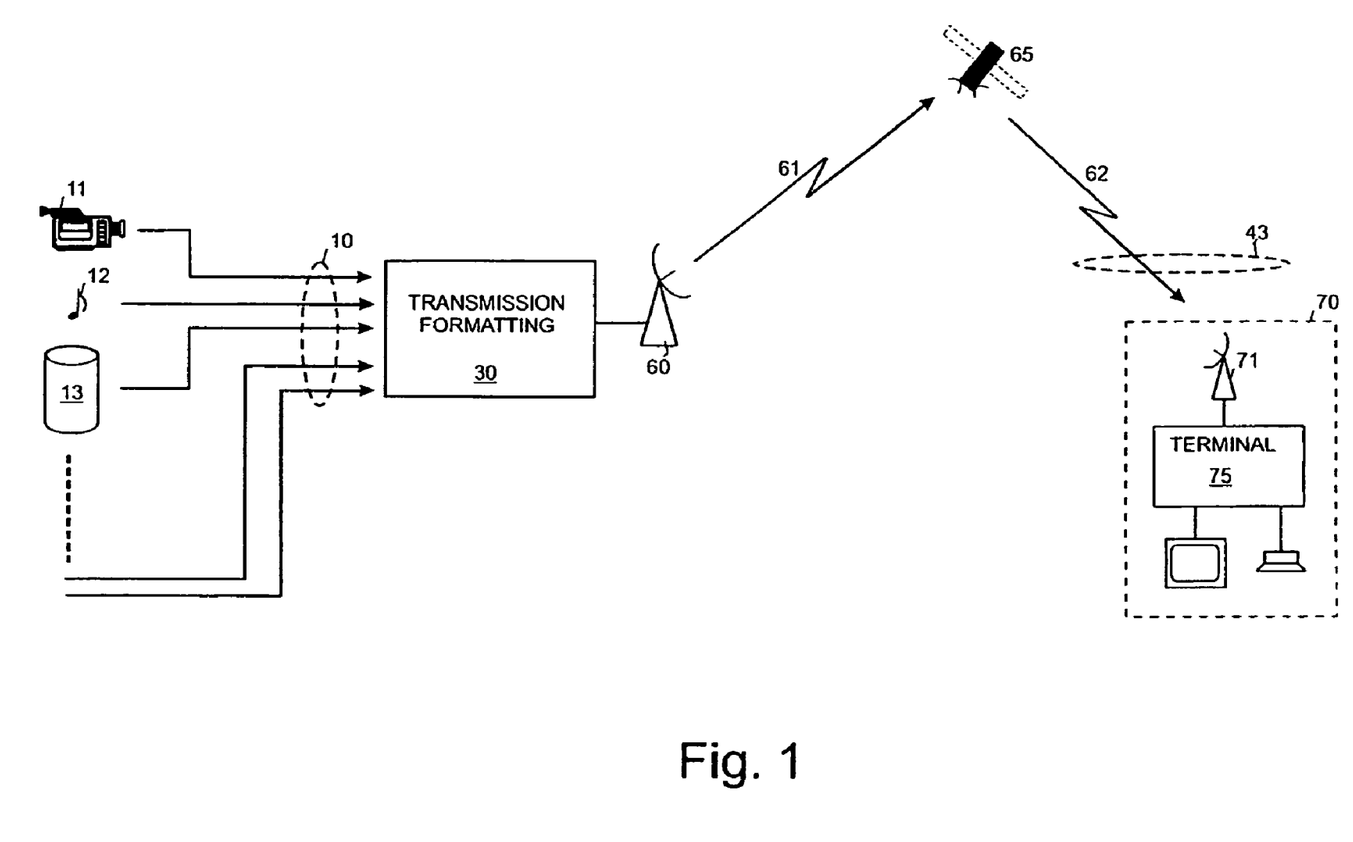
FIG. 1 shows a digital broadcasting system.

Digital Video Broadcasting (DVB) systems are well-established. Content streams, such as video and audio broadcasts, are broadcast in digital form using coding and modulation schemes which allow efficient use to be made of the available transmission spectrum. DVB content can be delivered by terrestrial transmission networks or by satellite transmission networks. In either case, there is a need to transport a plurality of DVB content streams over a transmission channel which has a finite bandwidth. FIG. 1 schematically shows a DVB transmission system. A plurality of content streams 10, such as audio and video data, may originate from a variety of different suppliers. The streams are coded, multiplexed and modulated onto a delivery bearer by a transmission formatting function 30. In the case of the satellite distribution network shown in FIG. 1, the delivery bearer is an uplink bearer 61 between a ground station 60 and a communications satellite 65. The satellite 65 translates the delivery bearer to a different part of the frequency spectrum before broadcasting the content over a region 43 to receiving terminals 75 at user premises 70.

Figure 2:
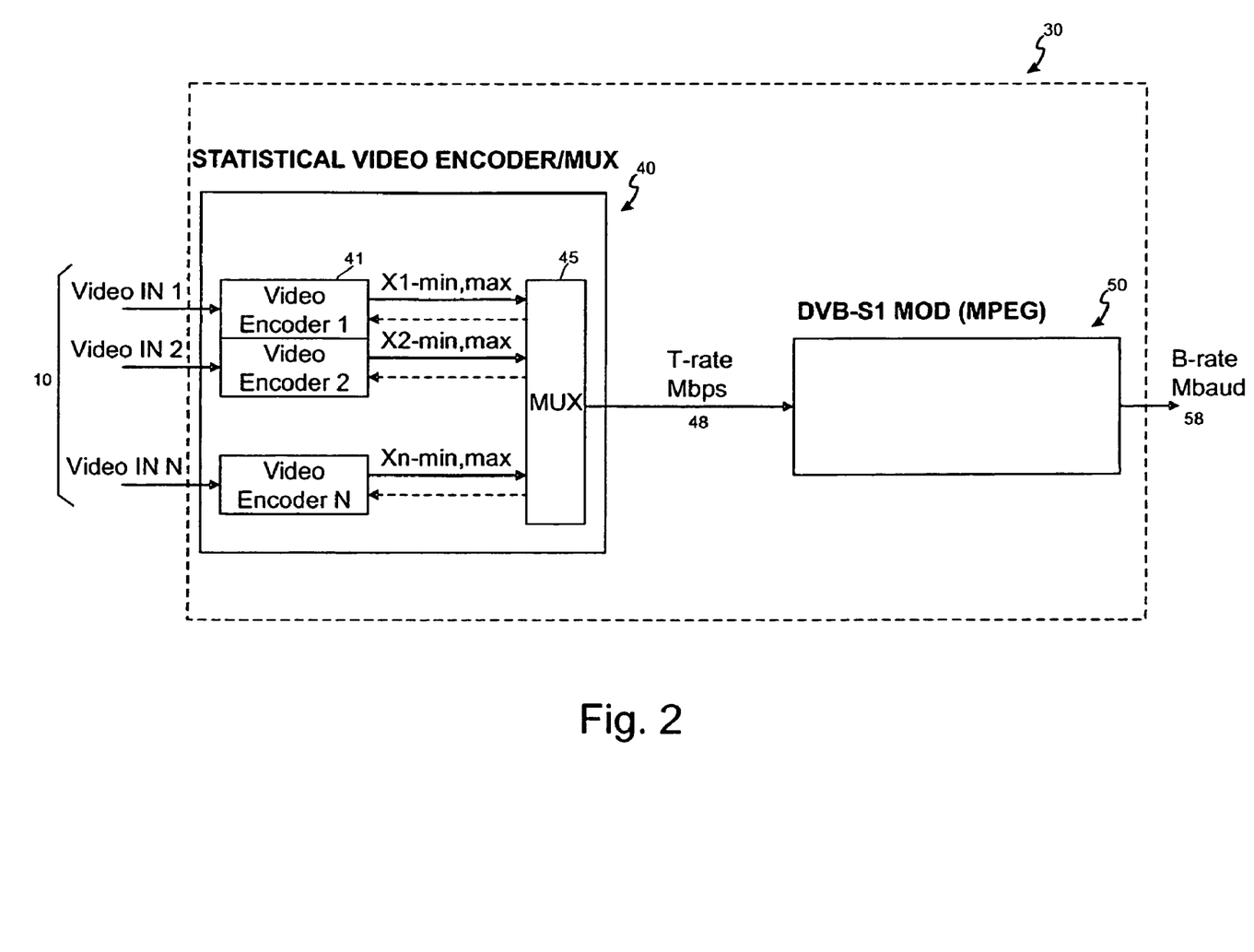
FIG. 2 shows a known transmission formatting arrangement for use in the transmit chain of the system of FIG. 1.

FIG. 2 shows an example transmission formatting function which would be used in the transmission chain of a Digital Video Broadcasting over Satellite 1 (DVB-S1) system. The main parts of the formatting function 30 are an encoding/multiplexing stage 40 and a modulating stage 50. The encoding stage 40 has a plurality of inputs 10, each representing a stream of audio/video data. Each stream is encoded by an encoder 41 using coding schemes such as MPEG-2. Such coding schemes generate a variable rate data stream, with the bit rate varying according to the complexity of the input stream. A video stream with a fast-moving or finely detailed image will cause the encoder to generate a higher data rate than a video stream with a static image or an image without fine detail. Similar schemes are used for coding audio data. The sum of the group of N coded outputs will vary according to the complexity of the individual input signals, at any time. A multiplexer 45 combines the coded data streams onto a link 48. The modulation stage 50 modulates the coded data onto a bearer having a finite capacity of B Mbaud. The modulation stage 50 uses a single modulation scheme and thus the relationship between the output rate of the multiplexer 45 and the modulation stage 50 is a straightforward relationship. As noted above, the transmission bearer 58 has a finite bandwidth which must be shared by the plurality of content streams. Coding units 41 can be adjusted, on a real-time basis, to apply a more harsh or lenient coding strategy to the input signals 1 such that the combined output of the multiplexer 45 is at, or less than, the maximum possible rate.

There is an ongoing desire to use the limited radio spectrum for satellite services in a more efficient manner. Digital Video Broadcasting over Satellite 2 (DVB-S2) aims to provide an increased performance over DVB-S1 by a choice of modulation methods, tighter channel roll-off and a more powerful forward error correction (FEC) scheme. Referring again to FIG. 2, the modulation stage 50 in a DVB-S2 system can use a range of possible modulation schemes, applying different modulation schemes to different streams and even changing a modulation scheme for any given stream. A consequence of the increased complexity of DVB-S2 is that the bit rate output by the multiplexer will no longer be related to the modulation stage and the capacity of the bearer 58 in a straight forward manner. This makes it considerably more difficult to multiplex content streams onto a bearer in real time. If the coding/multiplexing stage 40 generates too much data then buffers at the modulation stage 50 will begin to fill or overflow, incurring a transmission delay in the individual data streams or even loss of data. Conversely, if coder/multiplexer 40 applies a coding strategy which is unduly harsh, this will degrade the quality of the individual video streams.

Accordingly, the present invention seeks to provide an improved transmission formatting arrangement.

SUMMARY OF THE INVENTION

A first aspect of the invention provides a transmission formatting arrangement comprising: a plurality of inputs each for receiving a data stream such as non-coded data stream, e.g. an uncompressed video or audio signal, or an encoded data stream, e.g. a compressed digital video or audio signal or a network data stream such as an IP data stream; an encoding stage or a shaper having a plurality of inputs each for receiving data from the data streams, and a plurality of outputs that are each forming a variable rate bit stream; a multiplexer which combines the output variable rate bit streams of the encoding stage and/or the shaper to form an output stream; a modulation stage that is operable to use one or more of a plurality of different modulation schemes to modulate the bit streams onto an output bearer; and a controller that is operable to control the amount of data arriving at the modulation stage. The controller performs rate control of the data arriving at the modulation stage so that the rate of the data output in the output stream from the modulator stage is within a determined (but not necessarily predetermined) limit for the output transmission channel, e.g. to a satellite. For example, if the modulation rate for any bit stream changes, this would alter the rate of data transmission after the modulation stage. If this rate decreases, the excess data is stored in buffers in the modulator. By controlling the data rate arriving at the modulator stage, the controller regulates the amount of data stored in the buffer and thereby can help to avoid an overflow condition. The shaper is capable of making the rate of an output stream going to the modulation stage vary by using encoders on one or more uncoded streams, or transcoders on one or more encoded data streams or by remotely controlling the source of the data stream using one or more flow controllers. The shaper can be a statistical shaper.

The advantage provided by this system is that a better control over the data in the output signal can be obtained. The controller performs rate control of the data arriving at the modulation stage so that the rate of data output in the output stream from the modulator stage is within a limit for the transmission channel. By providing rate control, the buffer overflow is avoided and overall latency can be controlled and reduced. The controller for the modulator stage preferably monitors a value related to the rate of arrival of data in the bitstreams at the modulator and, in response thereto controls this rate of arrival of the data. This provides a feedback control which controls the data flow more efficiently. One way of monitoring is to monitor a buffer or buffers at the modulating stage. If the rate is too high, the buffers will begin to fill. The controller may take action to control the amount of data arriving at the modulation stage, when a certain criterion has been met, e.g. a certain filling of the buffers to a threshold value.

The amount of data arriving at the modulation stage can be controlled in several ways. In the case of video or audio inputs, it is known to operate the encoding stage or the shaper so that the sum of the plurality of variable bit streams output by encoders or transcoders or flow controllers falls within the maximum bit rate of the multiplexer. In accordance with an embodiment of the invention, the controller generates an amount of dummy data for introducing as a dummy input stream. The encoding stage or the shaper are "deceived" and consider the dummy traffic to be real traffic. The encoding stage adjusts the encoders and/or transcoders or the shaper adjusts the operation of the source of the encoded data streams by flow control in order to ensure that the sum of the encoded stream bit rates falls within the allowable maximum output bit rate of the multiplexer. The dummy data is removed by a filter before the modulation stage. This has the effect of reducing the amount of "real" data reaching the modulation stage.

Preferably, the dummy traffic is assigned an identification code which is known by the filter. For example, the identification code can be a Packet Identifier Code (PID) or a Virtual Local Area Network (VLAN) tag. By doing this, the dummy data can be recognised and controlled using standard protocols.

In a second embodiment of the invention, the output rate of the multiplexer and/or the processing units of the shaper is/are directly controlled by the controller. The advantage of directly controlling multiplexer and/or processing units is a more direct control response time rather than the indirect control by adding in dummy data. In one aspect thee controller issues a control signal which sets the output rate of the multiplexer. The multiplexer using its own control mechanisms then controls the coding stage to adjust the encoders or transcoders (or flow controllers) so that the sum of the plurality of variable rate bit streams output by the coding stage falls within the maximum bit rate of the multiplexer at any time. Alternatively, the controller operates directly on the processing units to change the data rate.

The functionality described here can be implemented in software, hardware or a combination of these. Accordingly, another aspect of the invention provides software for controlling operation of a transmitting formatting arrangement. The software may be stored on an electronic memory device, hard disk, optical disk or other machine-readable storage medium. The software may be delivered as a computer program product on a machine-readable carrier or it may be downloaded directly to the host apparatus via a network connection.

BRIEF DESCRIPTION OF THE DRAWINGS

Embodiments of the invention will be described, by way of example, with reference to the accompanying drawings in which.

DESCRIPTION OF PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Referring again to FIG. 1 this shows a digital broadcasting system for delivering content to terminals. Content intended for transmission is generated by a source and can take the form of live feeds of video 11 and audio 12 content, such as live television and radio programmes, and content which has been previously recorded and stored 13. The content is not restricted to video and audio data and can include data for data services or private data channels. The input date can be one or more non-coded data streams such as an uncompressed video or audio signal, or an encoded data stream such as a compressed digital video or audio signal or a network data stream such as an IP data stream or can be a mixture of these. Hence, the content streams 10 can be raw, uncoded (i.e. uncompressed) video/audio data or the feeds can already be coded in a particular format such as MPEG video or network data such as IP data. Content can originate from a number of different sources, e.g. different broadcasters.

Figure 3:
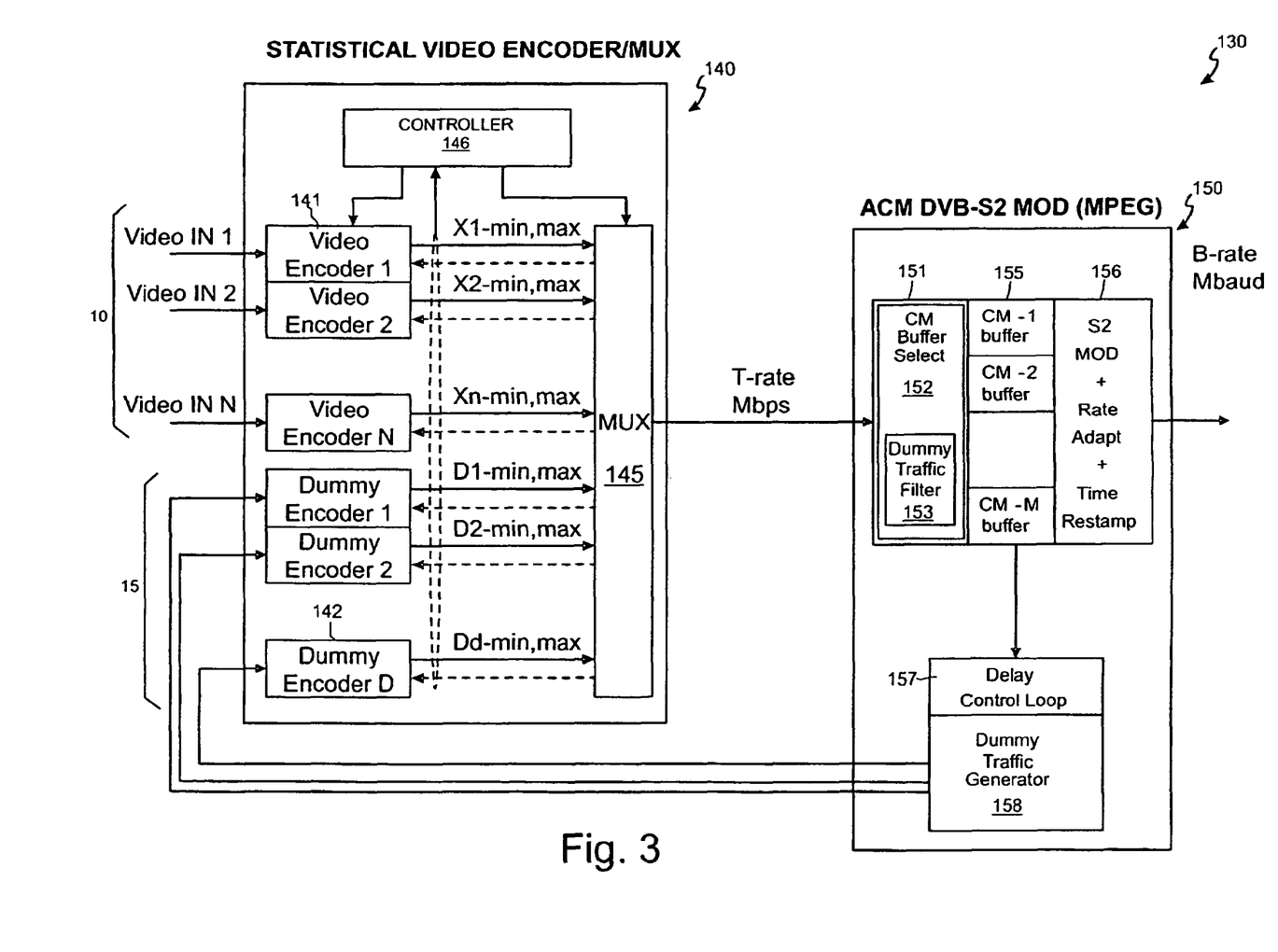
FIG. 3 shows a transmission formatting arrangement in accordance with a first embodiment of the invention.

FIG. 3 shows a transmission formatting arrangement 130 in accordance with a first embodiment of the invention. As with the arrangement shown in FIG. 2, the encoding/multiplexing stage 140 receives a plurality of content streams 10. In the following description shaping/encoding/multiplexing stage 140 will be referred to as a shaper, especially a statistical shaper. Typically, each program channel will comprise at least one elementary stream of some kind of data, e.g. video, audio and data, e.g. network data such as IP data which together carry the content for that program channel, e.g. a television channel will comprise a video elementary stream carrying the video content, an audio elementary steam audio carrying the soundtrack to accompany the video content and data for such services as subtitles. The shaper 140 will typically receive streams defining a plurality of different program channels. A set of data processing units 141 operate on the data feed such as to control the data rate being sent to the multiplexer 145. Processing units 141 may be coders that code the input streams according to coding schemes such as MPEG-2 audio and video as set out in ISO/IEC 13818-2 and ISO/IEC 13818-3. The bit rate X output by each coder will vary according to the complexity of the input stream, between a minimum and a maximum value. The set of coder outputs X1-Xn are applied to a multiplexer 145. Some or all of the streams may be coded feeds. In this case, if the input streams 10 are already coded, the coders 141 are transcoders for transcoding the content streams. Dependent upon the transcoding scheme used, the data rate being sent to the multiplexer 145 can be regulated. Some or all of the streams may be network data such as IP data. In this case the processing units 141 are flow controllers which can influence the data rate being fed to the statistical shaper and thereby influence the rate passed to the multiplexer 145.

In this embodiment shaper 140 receives, in addition to the 'real' data streams 10, one or more 'dummy' data streams 15 which are also applied to coders 142. The bit rate D output by each of the dummy traffic processing units 142 will also vary between a minimum and a maximum value. The processing units 142 can be coders or transcoders. As will be more fully described, these dummy data streams are generated by the modulation stage 150. A controller 146 within the shaper 140 monitors the total amount of traffic output by the set of processing units 141 and optionally 142 and adjusts operation of the coders to ensure that the total bit rate falls within the maximum allowable output rate of T Mbits/sec for the multiplexer. For example, adjustment of processing units operating as encoders or transcoders will take the form of applying a more harsh or lenient coding strategy to the data, as is well known. In the case that the processing units 141 are doing flow control, the processing unit 141 transmits signals to a data source to control the rate that this source sends data.

The algorithms used by controller 146 to shape the bandwidth can take many different forms. Incoming streams can each have a priority, or a quality of service (QoS), associated with them. The controller 146 can allocate bandwidth to each stream according to the priority or QoS of those streams. Controller 146 can acquire statistical data about streams over a period of time, which characterises the behaviour of the streams and can be used to forecast future values of the streams. Controller 146 uses this statistical data to decide how to apportion the available bandwidth (bit rate) at any time. The statistical data can include traffic descriptors such as mean bit rate, peak bit rate etc. Controller 146 can use one or more of these schemes to apportion bandwidth (bit rate).

Each processing unit, whether coder, transcoder or flow controller, generates an output data stream. The data streams are applied to multiplexer 145, which time multiplexes the packets onto a link to a modulator stage. The functions of the multiplexer will vary between implementations, but generally include packetisation/encapsulation, time multiplexing and creation of signalling tables for the transport stream. Both the 'real' data and 'dummy' data are processed, e.g. coded, in the same way. It can be seen that the data output by the multiplexer will comprise a mix of data packets carrying coded 'real' data from input streams 10 and data packets carrying coded 'dummy' data from inputs 15. Each packet includes a packet header which identifies the type of data carried by that packet. In a first embodiment dummy traffic is assigned a Packet Identifier (PID) known to the filter 153 in modulation stage 150.

Modulation stage 150 includes an input stage 151. This has a router 152 which inspects the headers of packets received from the multiplexer and routes them to the appropriate buffer. A dummy traffic filter 153 monitors the headers of packets arriving at the router 152. Packets which carry dummy data are identifiable by the PID field within their headers. Packets carrying dummy traffic are removed by filter 153 and are not queued at one of the buffers 155. A bank of modulators 156 each receive data from their respective buffer 155 and modulate the data according to a particular modulation scheme. The modulation stage 150 is operable in a Variable Coding and Modulation mode (VCM) or in Adaptive Coding and Modulation mode (ACM). In VCM mode each buffer 155 is associated to a particular service or set of services. This service or set of services is encoded and modulated with its own set parameters, which can vary over time. In DVB-S2 each buffer can also be associated with it's own Input Stream Identifier (ISI). In ACM (Adaptive Coding and Modulation) mode, each buffer is associated to a particular coding rate and modulation scheme. The packets are distributed dynamically into the various buffers according to the desired level of protection for each packet, and not according to their stream or service identification. In DVB-S2 the modulation scheme can be selected from a range of possible modulation schemes. Each modulation scheme has an efficiency which, in turn, dictates the amount of data that can be carried for a given channel bandwidth. The modulation schemes include variants of 32APSK, 16APSK, 8PSK and QPSK although other current, or future, modulation schemes can be used.

Each buffer 155 accumulates data. The amount of buffered data represents a time delay in the transmission of that data as well as being a value relating to the rate at which the data is arriving. A controller 157 monitors the amount of data arriving at the modulation stage. For example the amount of data (which represents the delay or latency) in each buffer can be monitored and based thereon dummy traffic can be generated. The amount of dummy data generated can be a fixed amount which can be varied, e.g. increased or decreased in stages or can be an amount depending on the delay in each buffer. It can be seen that there is a control loop which is responsive to the amount of data arriving at the modulators, e.g. the amount of delay at buffers 155. This control loop aims to maintain the delay at a constant level. As the amount of data at buffers 155 increases there is a rise in the delay and traffic generator 158 generates a higher level of dummy data. This dummy data consumes a part of the output of the multiplexer. This will have the effect of reducing the proportion of real data applied to multiplexer 145 and, in turn, reducing the amount of real data reaching buffers 155 after the dummy data has been removed. As the amount of data at buffers 155 reduces there is a reduction in the delay at buffers 155 and traffic generator 158 generates a lower level of dummy data, This will have the effect of increasing the proportion of real data applied to multiplexer 145 and, in turn, reaching buffers 155.

In VCM mode the coding and modulation scheme associated to each stream (CMi) does not vary or varies only occasionally. The bit rate of each service, or set of services, varies dynamically according to the content and quality constraint of these services. Since each service or set of services is encoded and modulated with its own set of parameters, the total throughput of the satellite channel also varies in a way that cannot be predicted. If ACM is used, the modulation and coding for each packet is also varying dynamically according to the receiving conditions reported by the receiving terminals 70. Therefore, the total channel throughput is varying unpredictably because of both effects (varying data rate of the services and channel condition). The feedback mechanism formed by the multiplexer 145 the delay control loop 157 and the traffic dummy generator 158 is used to compensate the dynamic variation of the total channel throughput in VCM or ACM mode.

In a variant of the first embodiment the operation of the set of processing units 141 is controlled in a way which is related to data throughput of the individual dummy streams and/or the amount of data in one or more of the buffers 155. As in the first embodiment, if the input streams 10 can be uncoded in which the processing units are encoders, can be already coded, in this case the coders 141 are transcoding the content streams, or can be network data such as IP data, in, which the processing units do flow control of the source. As in the first embodiment, the shaper 140 receives, in addition to the 'real' data streams 10, one or more 'dummy' data streams 15 which are also applied to processing units MPEG video or IP data, e.g. coders such as encoders or transocders. The bit rate D output by each of the dummy traffic processing units 142 will also vary between a minimum and a maximum value, As has been described, these dummy data streams are generated by the modulation stage 150. The dummy traffic generator 158 generates one or more dummy streams which are related to one or more of the streams filling up the buffers 155. A controller 146 within the shaper 140 monitors the total amount of traffic output by the set of coders and adjusts operation of the coders to ensure that the total bit rate falls within the maximum allowable output rate of T Mbits/sec for the multiplexer. As with the previous embodiment, encoders or transcoders 141 use different coding schemes to control data rate going to the multiplexer whereas a method of controlling the amount of network data such as IP data is flow control, i.e. the processing 141 transmits signals to one or more data sources to control the rate that these one or more sources send data. However, the difference with respect to the first embodiment is that the operation of at least one processing unit 141 is dependent upon the data throughput of at least one of the dummy streams. As before adjustment of the processing units 141 will take the form of applying a more harsh or lenient coding strategy to the data or to use more or less flow control, however this, coding or flow control strategy now depends upon the data throughput of at least one of the dummy streams. The algorithms used by controller 146 to shape the bandwidth take into account the amount of data in one or more of the dummy streams. One problem which can be addressed by this embodiment is that of fairness in the output stream to the satellite. Assume that the data rate of all the input streams to the statistical shaper are the same. Due to different modulation schemes used to modulate the individual input streams to the modulation stage, a more heavily modulated stream can take up more of the output stream to the satellite. In such a case all the input streams to the shaper will be penalised because one stream has a severe modulation scheme. This may be seen to be unfair. To compensate for this the amount of encoded data arriving at the multiplexer in that stream, the data input to the multiplexer is controlled using a stream-by-stream individual coding in the processing units 141 or by use of an individual flow control on each input stream. One way of doing this is to use weightings for the encoding or flow control. This will result in a modification in the ratios of data rate in the output streams to the satellite after the modulation stage. For example, assuming that a severe modulation scheme is to be used for one of the streams, then its relevant buffer 155 will fill up quickly. This will result in a larger amount of dummy data being input into the shaper for this stream. If the shaping is done globally based on the total amount of data being input to the shaper, then other streams will have to be more severely coded (or more flow control will have to be applied globally) in order to keep the data rate reaching the multiplexer within its limits. However, in accordance with this embodiment, the operating parameters of the coder 141 responsible for coding the input stream (or responsible for setting the flow control) relating to the stream which receives the severe modulation scheme are set such that the input data is more heavily coded than other streams (or more flow control is used). This would mean that even after application of the more severe modulation scheme on one or more streams in the modulation stage a greater fairness is obtained in the output stream going to the satellite. Summarising the above, this embodiment runs a specific algorithm for the controller 146, which adapts the operation of at least one of the processing 141 differently from the other processing 141 in dependency upon at least one of the dummy streams, e.g. the data throughput of at least one of the dummy streams. As the data throughput of a dummy data stream can be made to depend upon how fast a buffer 155 is filling, this embodiment also includes running a specific algorithm for the controller 146, which adapts the operation at least one of the processing units 141 differently from the other processing units 141 in dependency upon the rate at which at least one of the buffers 155 is filling up or emptying or more generally in dependency upon the rate at which at least one stream is reaching the modulation stage.

A further refinement of the above embodiment of the present invention is to use a combination of the controller 146 and the dummy traffic generator 158. A signal representing the modulation scheme used on each bit stream is sent from the modulation stage to the generator 158. Depending on the severity of the modulation scheme the generator applies a weighting to determine the amount of dummy data returned to the shaper for that stream. Then the controller 146 runs an algorithm as above which controls the encoding and/or flow control on each input stream in accordance with the data rate of the associated dummy stream. As indicated above the controller 146 can in an independent embodiment or in addition apply weightings. In this case the controller 146 can receive the signals representing the modulation scheme from the modulation stage.

Figure 4:
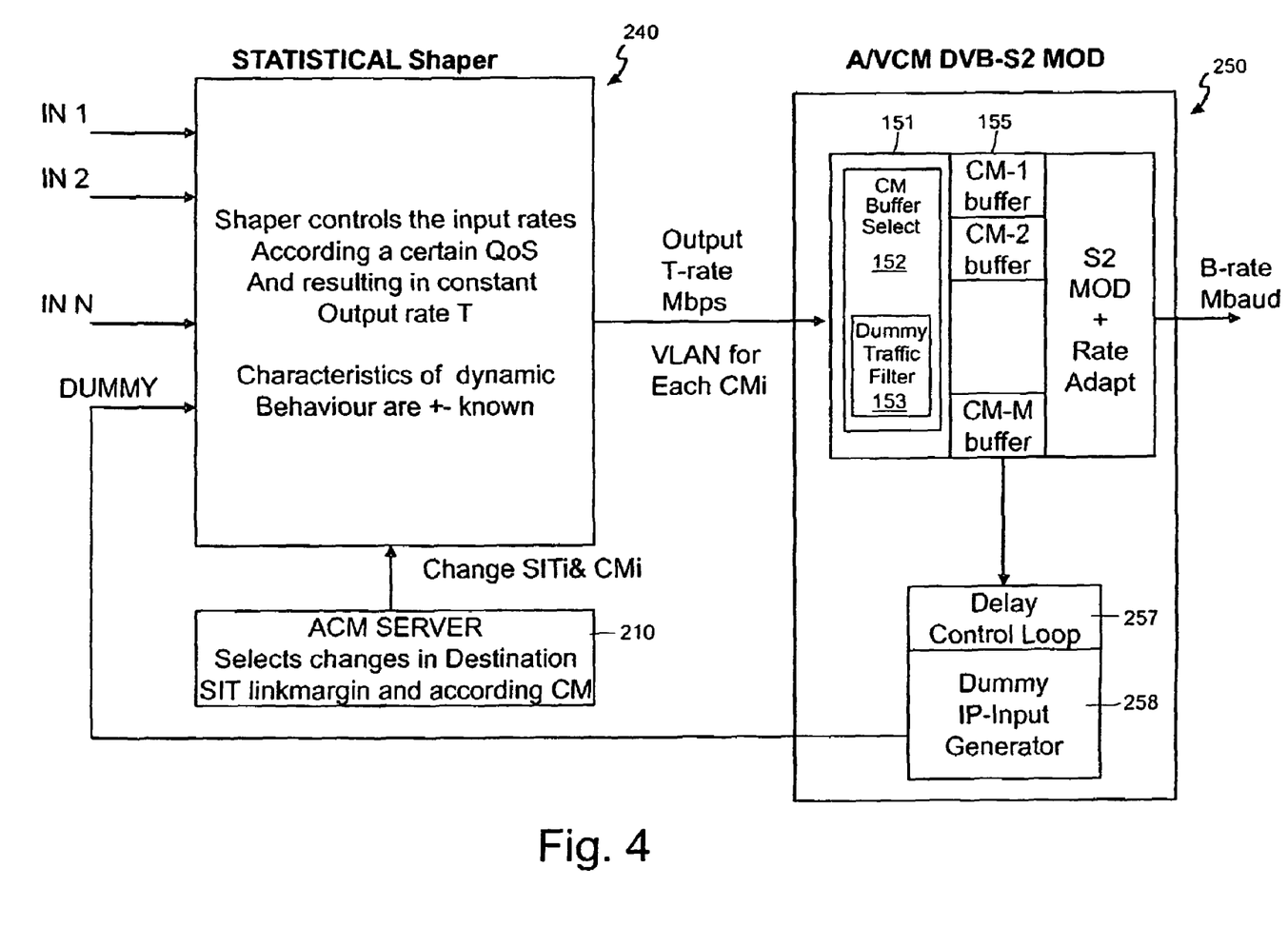
FIG. 4 shows a transmission formatting arrangement in accordance with a second embodiment of the invention; and, FIG. 5 shows a transmission formatting arrangement in accordance with a third embodiment of the invention.

FIG. 4 shows a transmission formatting arrangement in accordance with a second embodiment of the invention. This embodiment broadly works in the same manner as that just described, with a controller 257 monitoring a value which relates to the arrival rate of data at the modulation stage, e.g. monitoring the delay at buffers 155 in the modulation stage and generating an amount of dummy traffic which is applied to an input of the shaper 240. In this embodiment traffic arrives at shaper 240 in the form of Internet Protocol (IP) packets. In VCM mode, the traffic is organized in various streams, one for each particular destination in the satellite network. Each stream receives a unique Virtual Local Area Network (VLAN) identifier. The shaper 240 adds a VLAN tag to each packet depending on the stream to which that packet belongs. In ACM mode, each modulator Coding and Modulation scheme CMi is associated to a unique VLAN identifier and the shaper 240 adds a VLAN tag to each packet depending on the CMi to which that packet is destined. Dummy traffic which is also assigned a VLAN tag which is known to the filter 153. A server 210 maintains a table of modulators and VLAN tags and instructs coders which VLAN tag to apply. For the same IP service the VLAN tag can change during the course of a transmission. Varying weather conditions and fading are two examples of factors which can vary the signal to noise ratio (SNR) for a broadcast link and which will necessitate a change in the modulation scheme. As the link margin/SNR falls, the receiving terminal 70 send a message to the shaper to modify the coding and modulation scheme for all the traffic intended to this terminal. A new coding and modulation scheme is selected for that traffic and the appropriate VLAN tag for that scheme is applied by the server 210.

The embodiment of FIG. 4 can also be modified to run a specific algorithm for a controller (not shown), which adapts the operation of at least one of the processing units of the shaper 240 differently from the other processing units in dependency upon the rate at which at least one of the buffers 155 is filling or more generally in dependency upon the rate at which at least one stream is reaching the modulation stage. In this case the controller may adapt the operation of at least one processing unit of the shaper 340 so that a fairer distribution of data rate is obtained in the output signal to the satellite.

The further refinement of using a combination of a controller in the shaper and the dummy traffic generator 258 can also be used with this embodiment. A signal representing the modulation scheme used on each bit stream is sent from the modulation stage to the generator 258. Depending on the severity of the modulation scheme the generator applies a weighting to determine the amount of dummy data returned to the shaper for that stream. Then the controller in the shaper runs an algorithm as above which controls the way each input stream is processed in accordance with the data rate of the associated dummy stream to thereby control the amount of data output from the shaper. As indicated above the controller in the shaper can also apply the weightings—in this case the controller in the shaper receives the signals representing the modulation scheme from the modulation stage.

Figure 5:
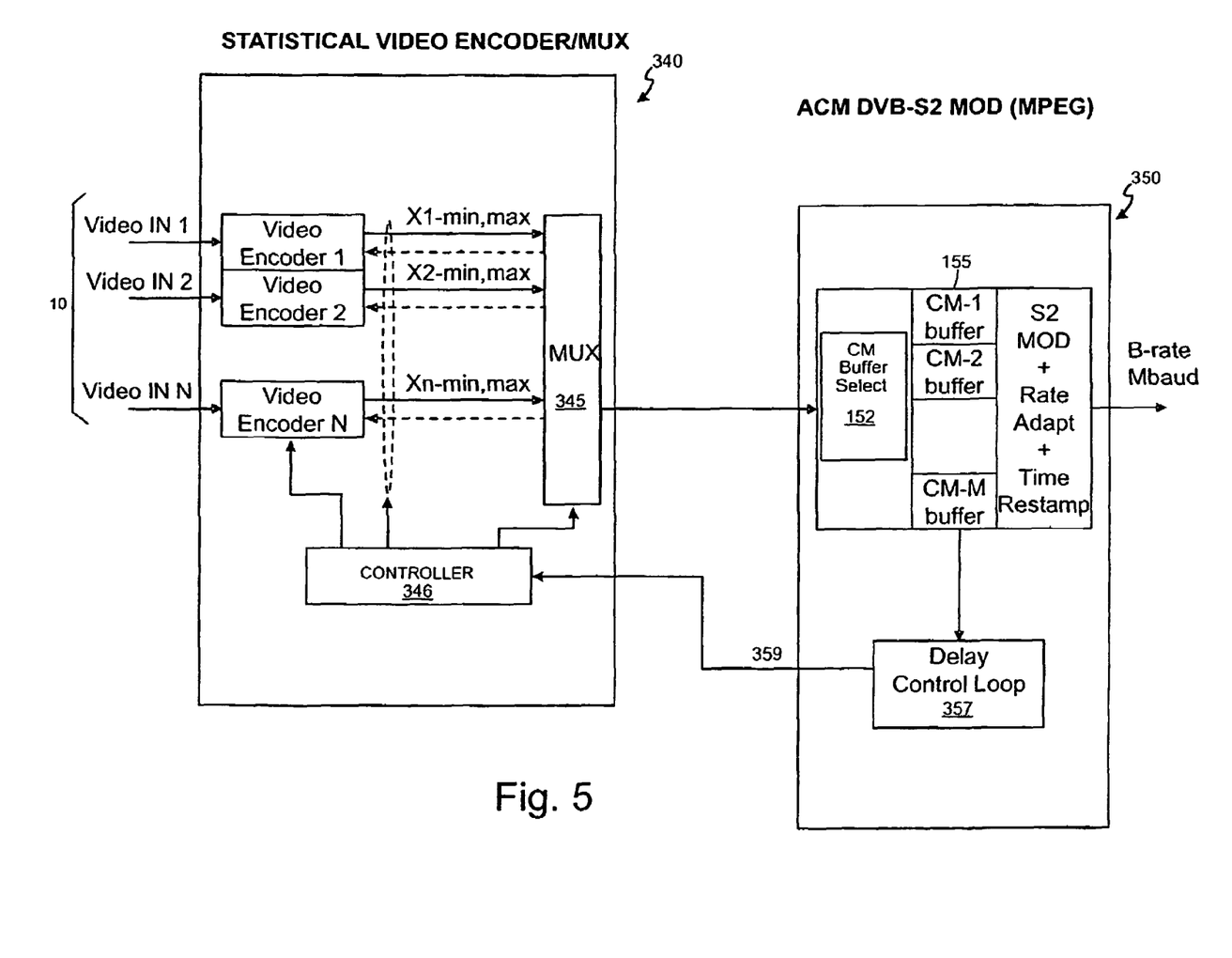

FIG. 5 shows a transmission formatting arrangement in accordance with a third embodiment of the invention. In this embodiment, dummy data is not created. Instead, the shaper 340 is instructed to vary the output rate of multiplexer 345. As previously described, a controller within the shaper 340 monitors the total amount of traffic output by the set of processing units such encoders, transcoders or flow controllers or mixtures of these and adjusts operation of the processing units to ensure that the total bit rate falls within the maximum allowable rate at that time. Adjustment of the processing units when operated as coders will take the form of applying a more harsh or lenient coding strategy to the data. When the processing units are receiving network data the processing units apply more or less flow control. The allowable rate at the output is increased or reduced depending on the amount of data queued at buffers 155 of the modulation stage 350. As buffers 155 start to fill, the shaper 340 is instructed to reduce the total bit rate that it outputs. As buffers 155 start to empty, the shaper is instructed, by control signal 359, to increase the amount of traffic that it can output. In this case the control signal from the modulation stage is applied to the processing units (encoders, transcoders or flow controllers) or the multiplexer directly as a feedback signal. This embodiment has the same overall effect as the first and second embodiments, and without the need to create dummy data. However, it does require the shaper 340 to accept a control input 359 from the delay controller 357, and for the shaper 340 to dynamically vary the output rate from multiplexer 345.

The embodiment of FIG. 5 can also be modified to run a specific algorithm for the controller 346, which by means of the control signal, adapts the operation of at least one of the processing units of the shaper 340 differently from the other processing units in dependency upon the rate at which at least one of the buffers 155 is filling or more generally in dependency upon the rate at which at least one stream is reaching the modulation stage. In this case, in response to a control signal, there is adaptation of the operation of at least one processing unit (e.g. encoder, transcoder or flow controller) of the shaper 340 so that a fairer distribution of data rate is obtained in the output signal to the satellite. This requires that the multiplexer can control some or every processing unit separately or that the controller 346 can control some or every processing unit separately.

In a further refinement a signal representing the modulation scheme used on each bit stream is sent from the modulation stage to controller 346. In dependence on the severity of the modulation scheme the controller 346 adapts the operation of at least one of the processing units of the shaper 340 differently from the other coders or instructs the multiplexer to do this.

The invention is not limited to the embodiments described herein, which may be modified or varied without departing from the scope of the invention.

The invention claimed is:

1. A transmission formatting arrangement comprising:
a plurality of inputs each for receiving a data stream;
a coding stage or a shaper having a plurality of inputs each for receiving data from the data streams, and a plurality of outputs that each form a variable rate bit stream, wherein the coding stage comprises a plurality of data encoders or transcoders which each encode or transcode one of the data streams to generate an encoded or transcoded variable rate bit stream or a plurality of flow controllers which each form a variable rate bit stream by flow control of a data source, and wherein the coding stage varies operation of the encoders or flow controllers to ensure that the sum of the plurality of variable rate bit streams is less than a predetermined maximum bit rate;
a multiplexer which combines the output variable rate bit streams of the coding stage and/or the shaper to form an output stream;
a modulation stage that uses a plurality of different modulation schemes to modulate the bit streams onto an output bearer;
and a controller that controls an amount of data arriving at the modulation stage, the controller generating an amount of dummy data as an input, and wherein the transmission formatting arrangement further comprises a filter which removes the dummy data before the modulation stage.

2. The transmission formatting arrangement according to claim 1 wherein the amount of dummy data is related to an amount of data buffered at the modulation stage.

3. The transmission formatting arrangement according to claim 1 wherein the dummy data is assigned an identification code which is known by the filter.

4. The transmission formatting arrangement according to claim 3 wherein the identification code is a PID code.

5. The transmission formatting arrangement according to claim 3 wherein the identification code is a VLAN tag.

6. The transmission formatting arrangement according to claim 1 wherein the coding stage or shaper acquires statistical data about each input stream and uses the statistical data to distribute bandwidth between the encoders or transcoders or flow controllers processing these streams.

7. The transmission formatting arrangement according to claim 1 wherein the coding stage or shaper uses quality of service (QoS) information for each input stream to distribute bandwidth between the encoders or transcoders or flow controllers processing those streams.

8. The transmission formatting arrangement according to claim 1 for use in the transmission chain of a digital video broadcasting (DVB) system.

9. A digital broadcasting system including a transmission formatting arrangement according to claim 1.

10. The transmission formatting arrangement according to claim 1, wherein the modulation schemes are dynamically selectable from a plurality of different modulation schemes available to the modulation stage; and wherein the controller monitors an amount of data buffered at, or a value related to rate of arrival of data at, the modulation stage and controls the amount of data arriving at the modulation stage based thereon.

11. A method of transmission formatting comprising:
receiving a plurality of input data streams;
shaping the input data streams to generate variable rate bit streams wherein the shaping includes varying operation of encoding, transcoding or flow control to ensure that the sum of the plurality of variable rate bit streams is less than a predetermined maximum bit rate;

multiplexing the variable rate bit streams to form an output stream;

modulating using one or more of a plurality of different modulation schemes to modulate the bit streams onto an output bearer;

monitoring a value relating to a rate of arrival of data of the bit streams and in response thereto controlling an amount of the data received for the modulating by generating an amount of dummy data as an input stream, and filtering to remove the dummy data before the modulating.

12. The method according to claim 11, wherein the amount of dummy data is related to an amount of data buffered at the modulation stage.

13. The method according to claim 11 wherein the encoding or transcoding or flow control includes acquiring statistical data about each input stream and using the statistical data to distribute bandwidth for the encoding, transcoding or flow control of those streams.

14. The method according to claim 11, wherein the encoding or transcoding or flow control uses quality of service (QoS) information for each input stream to distribute bandwidth for the encoding, transcoding or flow control of those streams.

15. A computer program product comprising code, which, when executed on a processing element carries out the method of claim 11.

16. A machine readable data storage medium storing the computer program product of claim 15.

17. The method according to claim 11, further comprising buffering data at the modulating step.

18. The method according to claim 17, wherein the modulating includes modulating the output stream onto the output bearer using one or more modulation schemes which are dynamically selected from a plurality of different modulation schemes; and the monitoring includes monitoring an amount of data awaiting modulating, or a value relating to the rate of arrival of data for modulating.

* * * * *